United States Patent [19]

Fragione, Jr.

[11] Patent Number: 4,671,522

[45] Date of Patent: Jun. 9, 1987

[54] PULL CART

[76] Inventor: Albert V. Fragione, Jr., 24 Filley St., Bloomfield, Conn. 06002

[21] Appl. No.: 791,795

[22] Filed: Oct. 28, 1985

[51] Int. Cl.⁴ .............................................. B62B 7/02
[52] U.S. Cl. .................................. 280/47.25; 188/119; 280/63
[58] Field of Search ........................ 280/63, 47.25, 1.5, 280/47.33, 152.1, 154.5 A; 188/119, 23

[56] References Cited

U.S. PATENT DOCUMENTS

| | | | |
|---|---|---|---|
| 1,259,466 | 3/1918 | Turner | 280/47.25 |
| 2,675,464 | 4/1954 | Schwinn | 280/152.1 |
| 2,708,119 | 5/1955 | Best | 280/47.25 |
| 3,141,681 | 7/1964 | Cedarstrand | 280/63 |
| 3,271,048 | 9/1966 | Beesley et al. | 280/63 |
| 3,566,994 | 3/1971 | Isaacs | 188/119 |
| 4,470,610 | 9/1984 | Wilson | 280/63 |

*Primary Examiner*—David M. Mitchell
*Attorney, Agent, or Firm*—McCormick, Paulding and Huber

[57] ABSTRACT

A Non-Motorized People Transporter having a frame member upon which a freely rotatable pair of wheels for movement is mounted thereon. A seat unit of sufficient size for three adult passengers to ride therein is mounted to said frame member. A pull bar which is attached to the middle of the frame member. An anti-tip bar which is attached to the rear of said frame member also acts as a braking device: as the adult puller lifts up the pull bar, the anti-tip device with a pad on the bottom, touches the travelled surface and drags the people transporter to a stop, providing for sure and safe stopping of the people transporter. The pull bar, along with seat bottom and wheels are detachable. A safety seat belt may be provided to hold the passengers in. Additions or modifications allow a canopy cover above and luggage rack on rear. Reflectors and lanterns are provided thereon for safety.

3 Claims, 6 Drawing Figures

PULL CART

The present invention relates to a non-motorized people transporter or pull cart in which is intended for one adult to pull up to three adult passengers comfortably.

I have done this by providing a, means to which wheels are rotatably mounted, and a seat, which may have a substantial amount of cushioning such that my people transporter can be pulled over rough terrain without unduly shaking the passenger or passengers. A pull bar, which is detachable, is used for pulling the transporter. An anti-tip bar is attached behind the frame to prevent my people transporter from being overturned and also acts as a braking system.

The intended use of the transporter is to provide a means for transporting people in areas where motorized transportation is unavailable or inadequate due to congestion, terrain, or other reasons.

Thus one of the main objects of the present invention is to provide a people transporter having means to carry passengers safely.

A further object of the present invention is to provide a people transporter which may be pulled by a wide variety of sizes of people with great ease.

A still further object is to provide a wheeled pull type vehicle having anti-tip means to prevent the vehicle from being overturned and which also serves as a braking device.

Further objects and advantages of this invention will be apparent from the following description and appended claims, reference being had to the accompanying drawings forming a part of the specification wherein like reference characters designate corresponding parts in the several views.

In accordance with the present invention an improved pull cart is provided which includes a frame and a single pair of laterally spaced apart wheels mounted for rotation about a common axis and supporting the frame to travel along the ground. A seat is mounted on the frame above the axis and a foot rest is also carried by the frame below the level of the seat, but generally forward of it. A generally U-shaped pull bar or drawbar has side members connected to and extending forwardly from opposite sides of the frame and a cross member connected to and extending generally transversally between the forward ends of the side members. Front supporting means cooperate with the wheels to support the cart in a resting position wherein the cross memeber is disposed above the level of the ground and below the level of the foot rest when the cart is resting on substantially flat ground. The cart has a traveling position wherein the foot rest is disposed in a generally horizontal position and the front supporting means is out of engagement with the ground. In the later position the cross member is disposed above the level of the foot rest. The cart has an anti-tip and braking means which includes an anti-tip and braking member mounted in fixed position on the frame and carrying a single shoe supported in fixed position rearwardly of and midway between the wheels for engaging the ground in the region of the longitudinal center-line of the car to limit rearward angular movement of the seat about the wheel axis and for braking movement of the cart in response to upward angular movement of the cross member about the wheel axis from its traveling position to a braking position. The cross member in the traveling position is disposed approximately midway between its location in its resting position and its location in its braking position.

Figure 1:
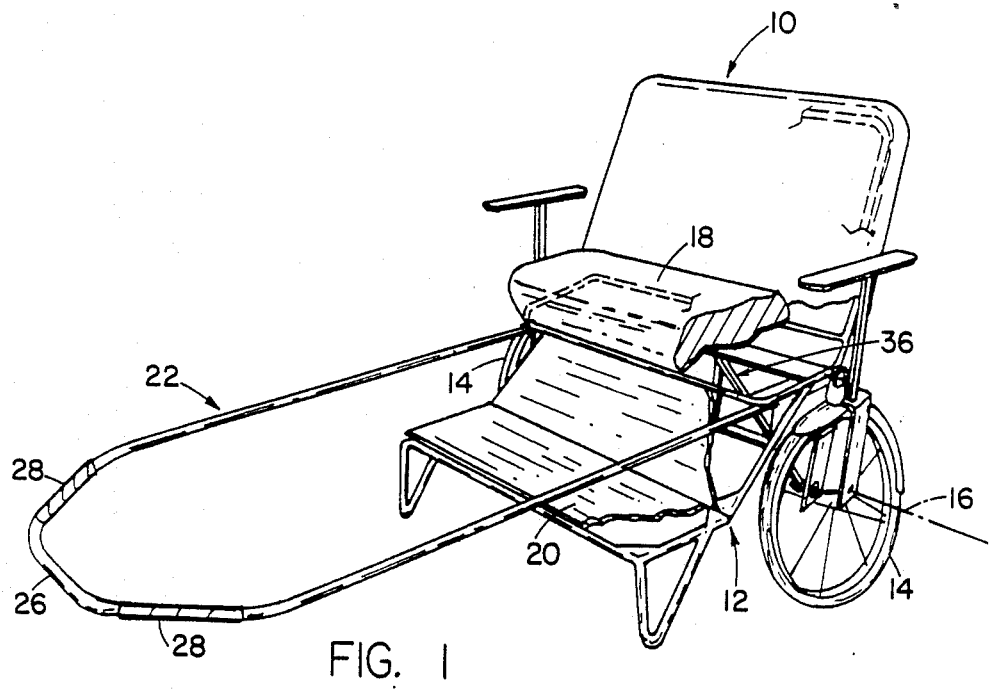
FIG. 1 is a front perspective view of a non-motorized people transporter or pull cart embodying my invention.

It is to be understood that the present invention is not limited to in its application to the details of construction and arrangement of parts illustrated in the accompanying drawings, since the invention is capable of other embodiments and of being practiced or carried out in various ways within the scope of the claims. Also, it is to be understood that the praseology and terminology employed herein is for purpose of discription and not of limitation.

Turning now to the drawings and referring first particularly FIGS. 1-5, a pull cart embodying the present invention is indicated generally by the reference numeral 10. The illustrated pull cart 10 is intended to be pulled by one adult and may carry as many as 3 adult passengers. it essentially comprises a frame indicated generally at 12 and a pair of transversely spaced apart wheels 14,14 journaled on the frame for rotation about a common axis, indicated by the numeral 16. The wheels support the frame to travel along the ground. A passenger seat 18 is mounted on the frame above the axis 16, substantially as shown. The frame 12 also carries a floorboard or foot rest 20 which is supported below the seat 18 and generally forward of it. A generally U-shaped pull bar indicated generally by the numeral 22 is provided for pulling the cart and includes a pair of side members 24,24, which extend forwardly from opposite sides of the frame 12 and a cross member 26 connected to and extending generally transversally between the forward ends of the side members 24,24. The cross member is preferably provided with a pair of transversally spaced apart wrapped or taped hand grips made from rubber, plastic or other suitable grip material and indicated at 28,28.

Figure 5:
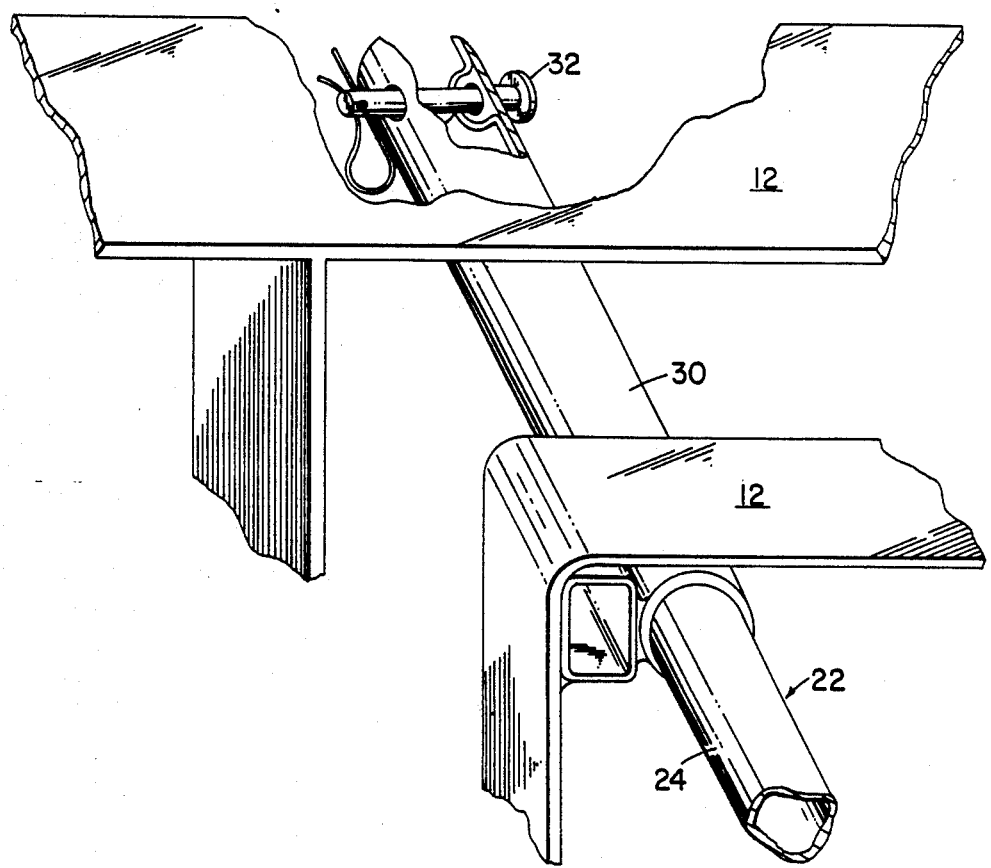
FIG. 5 is a somewhat enlarged fragmentary perspective view of the pull bar connection.

Preferably, and as shown, the pull bar 22 is releasably secured to the frame, so that it may be readily detatched from the cart when the cart is transported in another vehicle or the like. A typical pull bar connection is shown in FIG. 5 and includes a tubular retaining member 30 welded or otherwise suitable secured to an associated side of the frame for telescopically receiving the rear end portion of an associated side member 24, substantially as shown. A quick release type pin of a well known type is preferably employed to secure each side member within an associated tubular retaining member 30.

Figure 3:
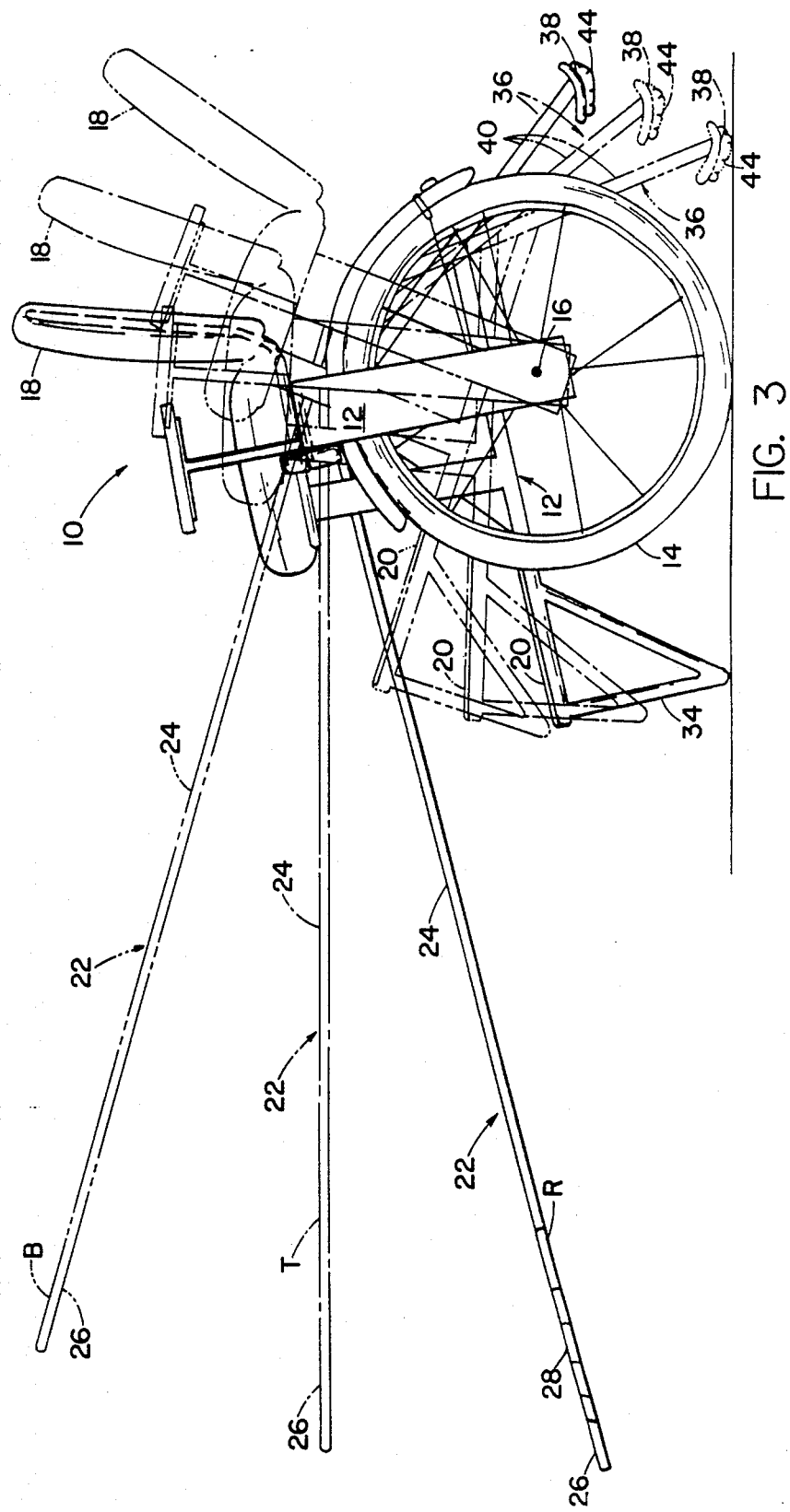
FIG. 3 is a side elevational view of the pull cart embodying my invention.
Figure 4:
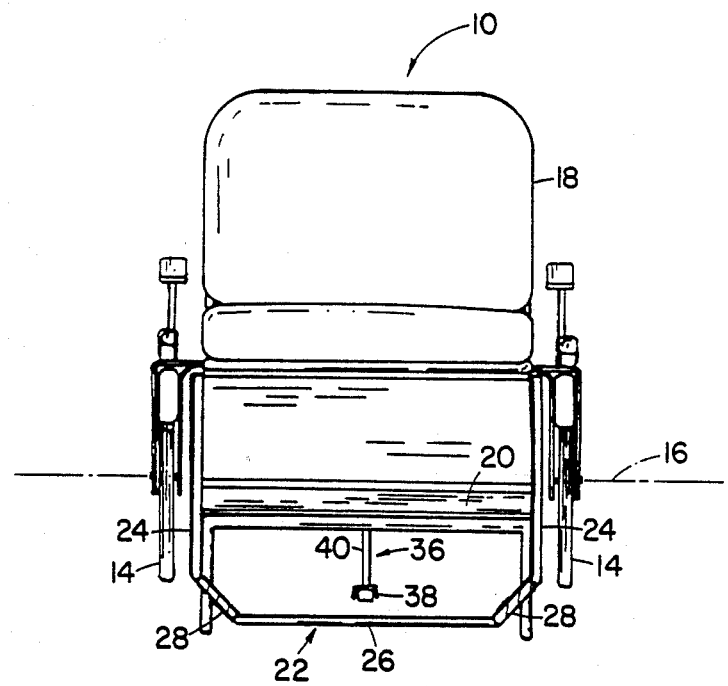
FIG. 4 is an front elevational view of said pull cart.

A pair of generally V-shaped front support members 34,34 are mounted on the frame 12 in transversally spaced apart relation to each other below the foot rest 20 and cooperate with the wheels 14,14 to support the cart in a resting position wherein the cross member 26 is disposed generally below the level of the foot rest 20 when the cart 10 is resting on relatively level ground. In FIG. 3 the cart 10 is shown in full lines in its resting position, the later position of the cart being indicated by the letter R. This arrangement allows a passenger to conveniently enter the cart from the front and take a seated position while the cart remains in its resting position, supported by the front supports 34,34 and the wheels 14,14.

Figure 2:
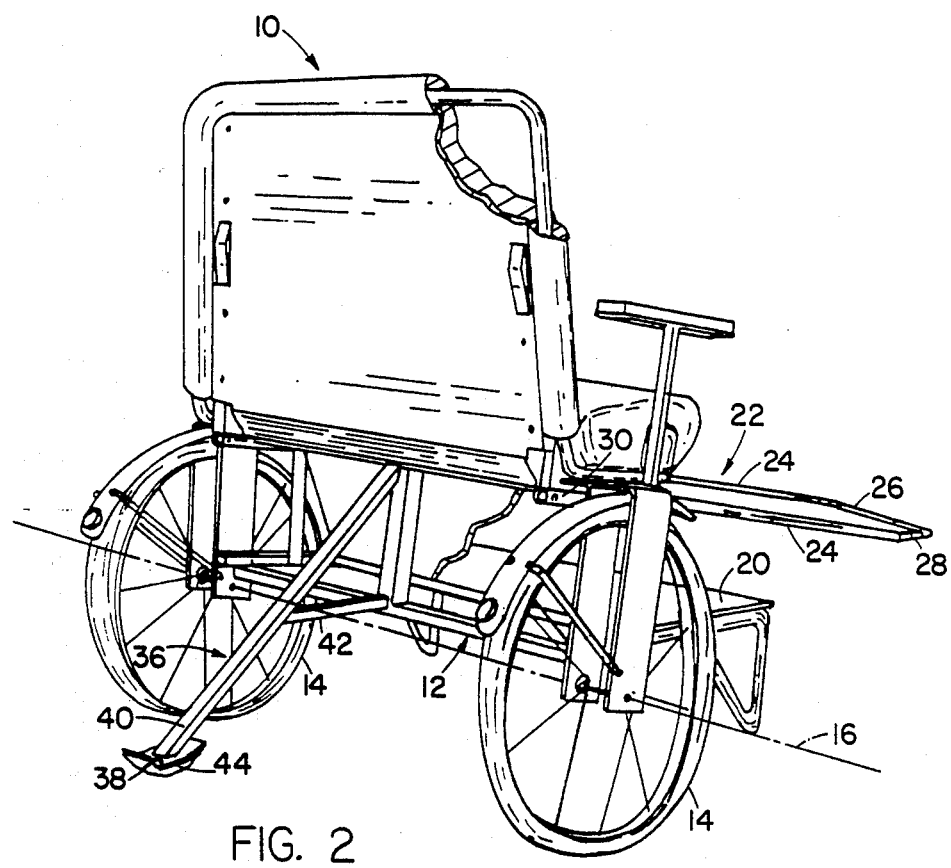
FIG. 2 is a rear perspective view of pull cart shown in FIG. 1.

In accordance with the present invention, the cart 10 also has an anti-tip and braking device for limiting rearward and angular tipping movement of the seat 18 about the axis 16 and for braking the cart 10 when it is traveling, as will be hereinafter more fully discussed. The anti-tip and braking device is indicated generally by the numeral 36 and essentially comprises a single shoe 38 supported in fixed position relative to the frame 12 rearward of the wheels 14,14 and midway therebetween. The illustrated shoe 38 is supported on the lower end of an outrigger or strut 40 which is fastened to the frame 12 generally below the seat and extends rearwardly and downwardly from the frame. the strut 40 is further supported by an elongated support member 42 which extends between the strut and another part of the frame as best shown in FIG. 2. When the cart is in its resting position, as it appears in full lines in FIG. 3 (position R), the lower or ground engaging surface of the shoe 38 is disposed a substantial distance above the ground. Preferably, and as shown, the lower surface of the shoe 38 is defined by a rubber pad indicated at 44.

The cart is normally pulled by one person who stands within the U-shaped pull bar 22 rearward of the cross member 26 and generally between the forward ends of the side members 24,24. The cross member 26 is preferably grasped at the grips 28,28 by the person who will be pulling the cart. The pull bar 22 may be easily lifted from its resting position of FIG. 3, even when there is a full passenger load in the cart, because the seat 18 is located substantially above the axis 16 in all normal positions of the cart. Thus, the passenger load is substantially supported by the wheels of the cart and does not need to be borne by the person pulling the cart.

When the pull bar 22 is raised to its traveling position of FIG. 3, shown in broken lines and indicated by the letter T, the foot rest 20 is disposed in a generally horizontal position and the cross member 26 is located above the level of the foot rest, substantially as shown in FIG. 3. The cart may be drawn or pulled with relatively little effort, because of the position of the load bearing seat 18 immediately above the axis of the wheels 14,14, as previously discussed.

The cart may be braked by raising the pull bar to its braking position of FIG. 3. The later position is indicated by broken lines and designated by the letter B. Elevating the cross member 26 to the position B of FIG. 3 brings the brake shoe 38 into engagement with the ground to serve as a drag brake.

It will be noted that the angular movement of the seat 18 between the resting position and the braking position is quite limited so that movement of the cross member 26, which is controlled by the person pulling the cart, is quite limited and does not cause passenger discomfort. It will be further noted with reference to FIG. 3 that the traveling position T is approximately midway between the resting position R and the braking position B. More specifically, the cross member 26 in the braking position B is angularly displaced about the axis 16 from its resting position through an angle not greater than 30 degrees. The later angle being indicated by the letter A in FIG. 3.

Should the person pulling the cart for some reason lose his grip on the cross member 26 the cart may tip either forwardly or rearwardly about the axis 16. The direction of tipping movement will, of course, generally be determined by the position of the cross member 26 at the time control is lost and the position of the passenger or passengers in the cart. However, if the cart 10 tips to the rear tipping movement will be arrested by engagement of the shoe 38 with the ground. Forward tipping movement will, of course, be arrested by the front support members 34,34.

The provision of an anti-tip and braking device having a single shoe mounted in fixed position midway between and spaced transversely inwardly of the wheels and rearward thereof and which engages the ground only in the region of tre longitudinal centerline of the cart assures uniform braking under all ground conditions. More specifically, braking occurs when the surface of the pad 44 engages the ground midway between the wheels so that there will be no tendency for the cart to yaw to either side when braking occurs, thereby assuring maintenance of control at all times.

Figure 6:
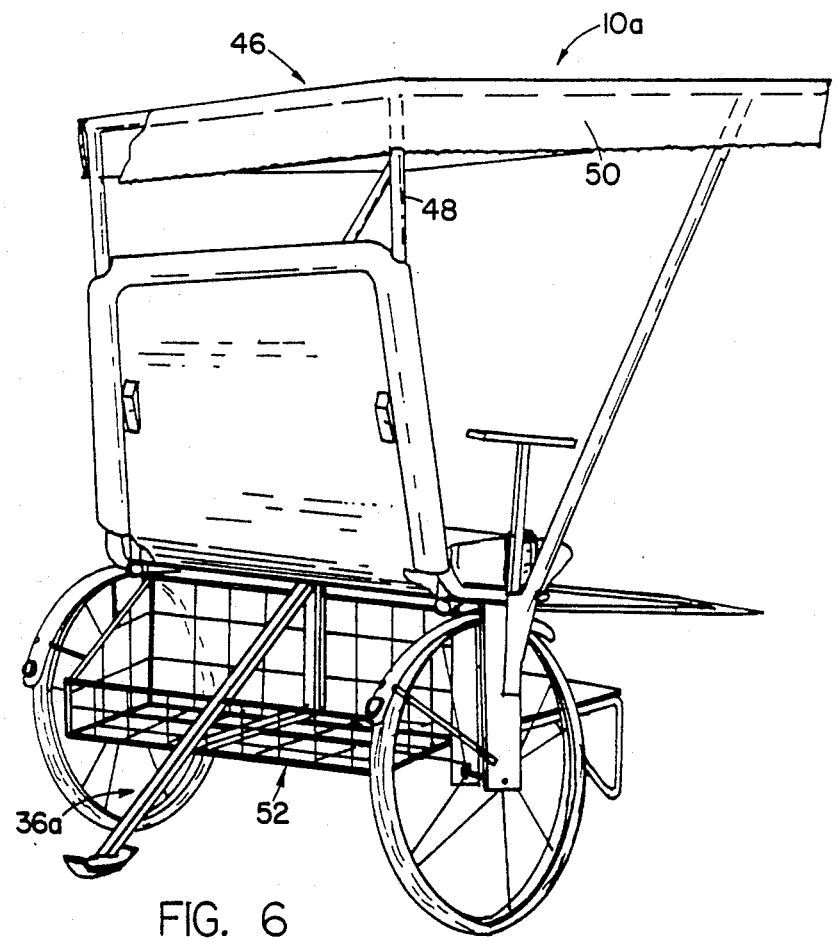
FIG. 6 is a rear perspective view of another pull cart embodying invention.

Referring now to FIG. 6, another cart embodying the present invention is shown and indicated generally by the reference numeral 10a. The cart 10a is similar in substantially all respects to the cart 10 previously described but has accessories not shown on the earlier described cart. Specifically, the cart 10a is provided with a canopy indicated generally at 46 which includes a frame 48 to which there is attached a flexible cover 50 made from fabric, plastic or like material to shelter passengers from the elements. The cart 10a also includes a luggage rack indicated generally at 52 which is associated with the anti-tip and braking device 36a. The luggage rack 52 which is attached to the frame may provide further support for the braking device 36a, substantially as shown.

Thus I have provided a well balanced non-motorized people transporter of durable and low maintenance free materials, that will allow for the weight to be kept on the wheels and not the adult puller, the puller being able to pull passengers sitting on the seats with great ease, and being able to stop the non-motorized people transporter quickly and safely; having the necessary features for a long and safe operation.

I claim:

1. A pull cart comprising a frame, a single pair of transversally spaced apart wheels mounted for rotation about a common horizontal axis and supporting said frame to travel along the ground, a seat mounted on said frame above said axis, a foot rest mounted on said frame below the the level of said seat and generally forward of said seat, a generally U-shaped pull bar having transversely spaced apart side members extending forwardly from opposite sides of said frame and a cross member connected to an extending transversely between the forward ends of said members, means for connecting said pull bar in fixed position relative to said frame, front supporting means cooperating with said wheels to support said cart in a resting position wherein said cross member is disposed above the level of the ground and below the level of said foot rest when the cart is resting on substantially flat ground, said cart having a traveling position wherein said foot rest is disposed in a generally horizontal position, said front supporting means is out of engagement with the ground, and said cross bar is disposed above the level of said foot rest, and an anti-tip and braking means for engaging the ground only near the longitudinal centerline of said cart to limit rearward angular movement of said seat about said axis and brake movement of said cart in response to upward angular movement of said cross member about said axis from said traveling position to a braking position and including an anti-tip and braking member mounted in fixed position on the frame and having a single shoe supported in fixed position rearward of and midway between said wheels and spaced a substantial transverse distance inwardly from each wheel said cross member in said traveling position being disposed approximately midway between the location of said cross member in said resting position and the position of said cross member in said braking position.

2. A pull cart as set forth in claim 1 wherein said cross member in said braking position is angularly displaced not greater than 30 degrees about said axis from its location in said resting position.

3. A pull cart as set forth in claim 1 wherein said means for connecting said pull bar comprise means for releasably connecting said side members to opposite sides of said frame.

* * * * *